United States Patent [19]
Konnai et al.

[11] 3,914,270
[45] Oct. 21, 1975

[54] S-(4-CHLOROBENZYL)-N,N-DIETHYLTHIOLCARBAMATE

[75] Inventors: Makoto Konnai, Ogasa; Hiroshi Kamata; Masaru Kado, both of Shimizu, all of Japan

[73] Assignee: Kumiai Chemical Industry Co., Ltd., Tokyo, Japan

[22] Filed: Nov. 5, 1973

[21] Appl. No.: 412,898

Related U.S. Application Data

[63] Continuation-in-part of Ser. No. 123,881, March 12, 1971, Pat. No. 3,846,115, which is a continuation of Ser. No. 19,546, March 19, 1970, Pat. No. 3,582,314, which is a continuation of Ser. No. 651,148, July 5, 1967, abandoned.

[30] Foreign Application Priority Data

Feb. 10, 1967 Japan.................................. 42-8153
Mar. 27, 1967 Japan................................. 42-18774

[52] U.S. Cl............................................ 260/455 A
[51] Int. Cl.$^2$........................................ C07C 155/02
[58] Field of Search................................ 260/455 A

[56] References Cited
UNITED STATES PATENTS
3,687,653  8/1972  Bollinger et al. ............... 260/455 A FOREIGN PATENTS OR APPLICATIONS
1,140,927  11/1959  Germany ........................... 260/455

OTHER PUBLICATIONS
C. A. Tilles. pp. 16955–16959.

*Primary Examiner*—Lewis Gotts
*Assistant Examiner*—D. R. Phillips
*Attorney, Agent, or Firm*—Stevens, Davis, Miller & Mosher

[57] ABSTRACT

This invention relates to a novel compound of S-(4-chlorobenzyl)-N,N-diethylthiocarbamate, which is useful as an active ingredient of herbicidal composition, a feed additive for growing chicken and a fungicide for sclerotium of Pellicularia Oryzae.

1 Claim, 1 Drawing Figure

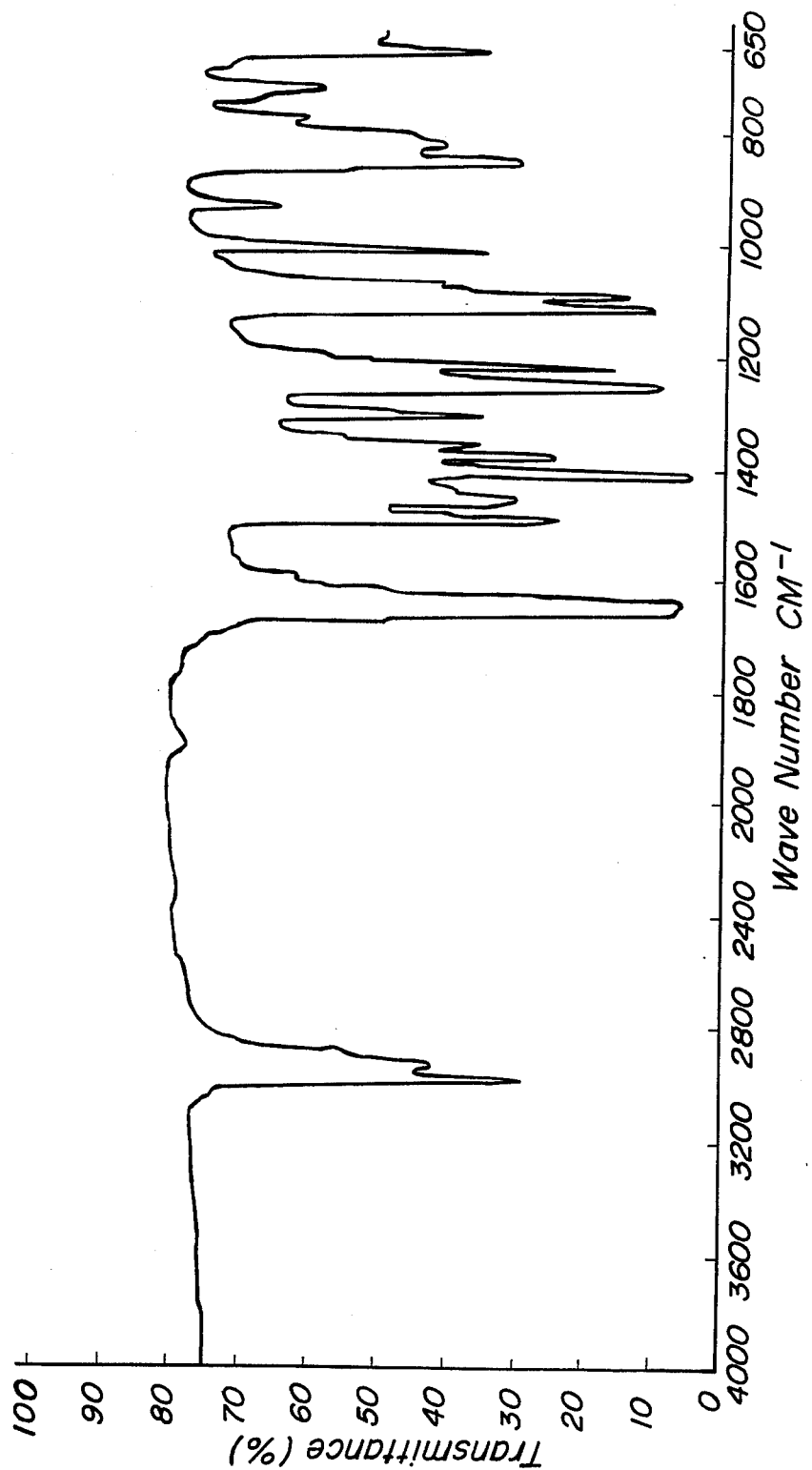

S-(4-CHLOROBENZYL)-N,N-DIETHYLTHIOLCARBAMATE

This application is a continuation-in-part of the copending application Ser. No. 123,881, filed Mar. 12, 1971, now U.S. Pat. No. 3,846,115, which is a continuation application of application Ser. No. 19,546, filed Mar. 19, 1970, now U.S. Pat. No. 3,582,314, which is a continuation application of application Ser. No. 651,148 filed July 5, 1967, now abandoned.

It is an object of the present invention to provide a novel compound of S-(4-chlorobenzyl)-N,N-diethylthiolcarbamate.

The novel compound of S-(4-chlorobenzyl)-N,N-diethylthiolcarbamate has a boiling point of 128°–136°C/0.02 mmHg and a refractive index of $n_D^{19} = 1.5632$. An infrared spectrum of S-(4-chlorobenzyl)-N,N-diethylthiolcarbamate is shown in the drawing. S-(4-chlorobenzyl)-N,N-diethylthiolcarbamate has LD50 value of 1,300 mg/kg for rat and LD50 value of 2,400 mg/kg for mouse, which are of remarkably low toxicity.

The following example is a typical preparation of useful S-(4-chlorobenzyl)-N,N-diethylthiolcarbamate.

EXAMPLE 1

A solution of 31 g (0.2 mol) of 4-chlorobenzylmercaptan in 100 ml of toluene was mixed with 70 g (about 0.2 mol) of 30% solution of phosgene in toluene. To the resulting mixture were added dropwise 24.2 g (0.2 mol) of dimethylaniline while stirring under cooling with ice maintaining the temperature below 5°C.

After addition of the said dimethylaniline, the mixture was stirred for one hour while maintaining such a condition and was added dropwise with 29.2 g (0.4 mol) of diethylamine at a temperature of lower than 15°C. Furthermore, the resulting mixture was stirred at room temperature for 1 hour and then at about 60°C for 3 hours to complete the reaction, and then the temperature was returned to room temperature. After the reaction, the formed dimethylaniline hydrochloride was removed by washing with water and organic layer was dried with anhydrous sodium sulfate and then concentrated.

The resulting liquid was distilled in vacuum to obtain 41 g (yield: 79.5%) of a transparent liquid having a boiling point of 128°–136°C/0.02 mmHg and a refractive index of $n_D^{19} = 1.5632$.

| Elemental analysis | Calculated value | Found value |
|---|---|---|
| N | 5.43 | 5.28 |

EXAMPLE 2

A mixture of 13.5 g (0.1 mol) of diethylcarbamoyl chloride, 15.9 g (0.1 mol) of p-chlorobenzylmercaptan, 150 ml of xylene and 0.1 ml of diethylaniline was heated at 100°C for 5 hours with the vigorous stirring. After cooling, the xylene layer was washed with water.

The xylene was removed after drying over anhydrous sodium sulfate.

The resulting liquid was purified by vacuum distillation to obtain 24.3 g (yield: 94.5%) of a transparent liquid having a boiling point of 129°–136°C/0.01 mmHg and a refractive index of $n_D^{20} = 1.5634$.

EXAMPLE 3

A 200 ml of four-necked flask was equipped with stirrer, condenser, thermometer and gas inlet tube. A mixture of 7.3 g (0.1 mol) of diethylamine and 4.0 g (0.1 mol) of sodium hydroxide in 80 ml of water was charged into the flask, and then 6.6 g (0.1 mol) of carbonyl sulfide was introduced in the mixture at 0°–5°C over 4 hours under the vigorous stirring.

After the introduction of carbonyl sulfide, the reaction mixture was stirred at 0°–5°C for 2 hours. The mixture was diluted with 50 ml of acetone, and 20.5 g (0.1 mol) of p-chlorobenzyl bromide was added into the reaction mixture at 5°–10°C.

After the addition of p-chlorobenzyl bromide, the reaction mixture was stirred at 56°–65°C for 5 hours, and the acetone was removed. The residue was extracted with 200 ml of benzene and washed with water. The benzene was removed after drying over anhydrous sodium sulfate. The resulting liquid was purified by vacuum distillation to obtain 25.0 g (yield: 97.0%) of a transparent liquid having a boiling point of 128°–136°C/0.02 mmHg and a refractive index of $n_D^{19} = 1.5632$.

S-(4-chlorobenzyl)-N,N-diethylthiolcarbamate according to the present invention is useful as an active ingredient of herbicidal composition and a feed additive for growing chicken and a fungicide for sclerotium of Pellicularia Oryzae.

In order to show superior effect of S-(4-chlorobenzyl)-N,N-diethylthiolcarbamate over the known compounds, the following comparative tests were carried out. (Test 1)

Growth promoting effect for growing chicken:

10–200 ppm of S-(4-chlorobenzyl)-N,N-diethylthiolcarbamate was uniformly admixed with the following composition of the basal feed with vitamins and minerals.

Forty broiler chickens (20 males and 20 females) in each group were fed in floor pen for 8 weeks.

A rate of weight grains and feed efficiency of the group fed with the composition of the test feed containing S-(4-chlorobenzyl)-N,N-diethylthiolcarbamate were remarkably higher than those of the group fed with the composition of basal feed, as shown in Table 1.

Table 1

Average weight and feed efficiency:

| Group | Active ingredient in feed (ppm) | Initial | After 4 weeks | After 8 weeks | Rate of weight gain | Feed efficiency |
|---|---|---|---|---|---|---|
| 1 | none | 42 | 530 | 1,706 | 100.00 | 2.45 |
| 2 | 10 | 42 | 386 | 1,753 | 102.76 | 2.40 |
| 3 | 50 | 42 | 588 | 1,790 | 104.92 | 2.34 |
| 4 | 100 | 42 | 591 | 1,835 | 107.56 | 2.33 |
| 5 | 200 | 42 | 593 | 1,860 | 109.93 | 2.29 |

The remarkable growth improving effect of S-(4-chlorobenzyl)-N,N-diethylthiolcarbamate was confirmed. No decrease of weight of chicken was found by feeding a large amount of S-(4-chlorobenzyl)-N,N-diethylthiolcarbamate.

Table 2

Composition of basal feed:

| | % of Diet | |
|---|---|---|
| | Start 0–4 weeks | Finish 4–8 weeks |
| Yellow Corn | 42.6 | 43.0 |
| Milo Meal | 20.0 | 20.6 |
| Soybean Meal | 19.0 | 8.0 |
| Rusan Meal | 2.0 | 2.0 |
| Fish Soluble | 2.6 | 2.4 |
| Fish Meal | 6.0 | 9.5 |
| Sesame Meal | 4.0 | 4.0 |
| Fat Feed | — | 7.0 |
| Calcium Carbonate | 1.4 | 1.3 |
| Salt | 0.2 | — |
| Mycelium | 0.5 | 0.5 |
| Calcium Phosphate | 1.2 | 1.2 |
| Premix* | 0.5 | 0.5 |
| Total | 100.0 | 100.0 |

*Premix contains mineral and vatamin are shown in Table 3.

Table 3

Premix of Vitamin and Mineral in basal feed. Vitamin and Mineral in this Table are added in basal feed as premix (in 1 kg feed)

| Element | Start | Finish | |
|---|---|---|---|
| Vitamin A | 6,000 | 3,000 | IU |
| Vitamin $D_3$ | 1,200 | 600 | IU |
| Vitamin E | 0.26 | 0.13 | IU |
| Vitamin $B_1$ | 1.0 | 0.5 | mg |
| Vitamin $B_2$ | 6.0 | 3.0 | mg |
| Vitamin $B_6$ | 2.0 | 1.0 | mg |
| Pantothenic Acid | 9.0 | 4.5 | mg |
| Nicotinic Acid | 14.0 | 7.0 | mg |
| Choline Chloride | 300.0 | 150.0 | mg |
| Folic Acid | 0.1 | 0.05 | mg |
| Manganese | 120.0 | 60.0 | mg |
| Iron | 20.0 | 10.0 | mg |
| Copper | 2.0 | 1.0 | mg |
| Iodine | 1.0 | 0.5 | mg |
| Cobalt | 0.1 | 0.05 | mg |
| Zinc | 80.0 | 40.0 | mg |

(Test 2)

Tests of weed control activity and rice phytotoxicity:

Test method:

Sandy soil (clay content: about 10%), loam (clay content: about 30%), and clay loam (clay content: about 70%) were fed in porcelain pots having a diameter of 15 cm, respectively, and then each pot was flooded with water to a depth of 3 cm. Thereafter, 10 rice plants of 2-leaf stage (variety: KINMAZE) were planted in the each pot, and 24 hours later 50 seeds of Barnyardgrass, Echinochloa crus-galli and Konagi, Monochoria vaginalis per pot were sowed thereon.

Three days later, a test solution prepared by diluting a given amount of a 25% wettable power of active ingredient shown in the following Table 4 with 10 ml of water was uniformly dropped on the water surface in the pot. Twenty days after the treatment, the inhibition rate against Barnyardgrass and Konagi and phytotoxicity on paddy rice plant were determined.

The said 25% wettable powder was prepared as follows:

Twenty five parts by weight of thiocarbamate, 10 parts by weight of white carbon, 60 parts by weight of diatomaceous earth and 5 parts by weight of wetting agent of a mixture of polyoxyethylenealkyl phenol ether, polyoxyethylenephenol ether and polyoxyethylene carbonate were mixed and milled.

Table 4

| Active Ingredient | Dosage in Active Ingredient (g/10 a) | Sandy Soil | | | Loam | | | Clay Loam | | |
|---|---|---|---|---|---|---|---|---|---|---|
| | | Inhibition rate | | Phyto-toxicity | Inhibition rate | | Phyto-toxocity | Inhibition rate | | Phyto-toxicity |
| | | Barn-yard-grass | Konagi | Paddy rice plant | Barn-yard-grass | Konagi | Paddy rice plant | Barn-yard-grass | Konagi | Paddy rice plant |
| Present Invention 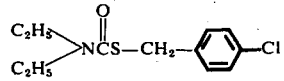 | 400 | 5 | 5 | — | 5 | 5 | — | 5 | 5 | — |
| | 100 | 5 | 4 | — | 5 | 4 | — | 5 | 4 | — |
| U.S. Pat. No. 2,992,091 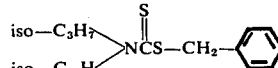 | 400 | 4 | 4 | ++ | 3.5 | 3.5 | + | 3 | 3.5 | — |
| | 100 | 2 | 2 | — | 1 | 2 | — | 1 | 1 | — |
| 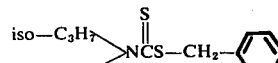 | 400 | 4 | 4.5 | ++ | 3.5 | 3.5 | + | 3 | 3.5 | — |
| | 100 | 2 | 2 | — | 1 | 2 | — | 1 | 1.5 | — |
| 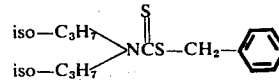 | 400 | 4.5 | 4.5 | ++ | 3.5 | 4 | + | 3 | 3.5 | — |
| | 100 | 2 | 3 | — | 1 | 2 | — | 1 | 1 | — |
| 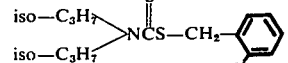 | 400 | 4 | 4 | ++ | 3 | 3.5 | + | 2.5 | 3 | — |
| | 100 | 2 | 2 | — | 1 | 2 | — | 0 | 1 | — |
|  | 400 | 3.5 | 3 | + | 2.5 | 2 | ± | 2 | 2 | — |
| | 100 | 1.5 | 1 | — | 0 | 0 | — | 0 | 0 | — |

Table 4 — Continued

| Active Ingredient | Dosage in Active Ingredient (g/10 a) | Sandy Soil Inhibition rate Barnyard-grass | Sandy Soil Inhibition rate Konagi | Sandy Soil Phytotoxicity Paddy rice plant | Loam Inhibition rate Barnyard-grass | Loam Inhibition rate Konagi | Loam Phytotoxocity Paddy rice plant | Clay Loam Inhibition rate Barnyard-grass | Clay Loam Inhibition rate Konagi | Clay Loam Phytotoxicity Paddy rice plant |
|---|---|---|---|---|---|---|---|---|---|---|
| (CH$_3$)$_2$N-C(=S)-S-CH$_2$-C$_6$H$_5$ | 400 | 4.5 | 4.5 | ++ | 4.5 | 4 | + | 4 | 4 | — |
|  | 100 | 3 | 2.5 | — | 2 | 2 | — | 2 | 2 | — |
| (C$_2$H$_5$)$_2$N-C(=O)-S-CH$_2$-C$_6$H$_2$Cl$_3$ | 400 | 3.5 | 2.5 | + | 3 | 2 | ± | 3 | 2 | — |
|  | 100 | 1.5 | 1 | — | 1 | 0 | — | 1 | 0 | — |
| (iso-C$_4$H$_9$)$_2$N-C(=O)-S-CH$_2$-C$_6$H$_2$Cl$_3$ Australian Patent 272,771 | 400 | 3 | 3 | ± | 2.5 | 2.5 | — | 2 | 2 | — |
|  | 100 | 1 | 1 | — | 0 | 0 | — | 0 | 0 | — |
| (iso-C$_3$H$_7$)$_2$N-C(=O)-S-CH$_2$-C$_6$H$_3$Cl$_2$ (2,4-diCl) | 400 | 5 | 5 | +++ | 5 | 4.5 | ++ | 4.5 | 4.5 | + |
|  | 100 | 3.5 | 3 | + | 3 | 3 | — | 2.5 | 2.5 | — |
| (iso-C$_3$H$_7$)$_2$N-C(=O)-S-CH$_2$-C$_6$H$_3$Cl$_2$ (2,6-diCl) | 400 | 5 | 4.5 | ++~ +++ | 4.5 | 4 | ++ | 4.5 | 4 | + |
|  | 100 | 3 | 2.5 | + | 2.5 | 2 | — | 2.5 | 2 | — |
| (iso-C$_3$H$_7$)$_2$N-C(=O)-S-CH$_2$-C$_6$H$_4$Cl (3-Cl) | 400 | 5 | 4.5 | ++~ +++ | 5 | 4 | ++ | 4.5 | 3.5 | + |
|  | 100 | 3 | 2 | ± | 2.5 | 2 | — | 2 | 1.5 | — |
| (iso-C$_3$H$_7$)$_2$N-C(=O)-S-CH$_2$-C$_6$H$_3$Cl$_2$ (2,3-diCl) | 400 | 2.5 | 2.5 | ± | 2.5 | — | 2 | 2 | — | — |
|  | 100 | 0 | 1 | — | 0 | 0 | — | 0 | 0 | — |
| (iso-C$_3$H$_7$)$_2$N-C(=O)-S-CH$_2$-C$_6$H$_5$ | 400 | 5 | 4.5 | +++ | 5 | 4.5 | ++ | 5 | 4 | +~ ++ |
|  | 100 | 4 | 2 | + | 4 | 2 | ±  +~ | 3.5 | 2 | — |
| (n-C$_4$H$_9$)$_2$N-C(=O)-S-CH$_2$-C$_6$H$_5$ | 400 | 5 | 4 | ++ | 4.5 | 3.5 | ++ | 4.5 | 3.5 | + |
|  | 100 | 3 | 2 | — | 2 | 1 | — | 2 | 1 | — |
| Blank sample* | — | 0 | 0 | — | 0 | 0 | — | 0 | 0 | — |
| Untreated | — | 0 | 0 | — | 0 | 0 | — | 0 | 0 | — |

*Note: In the above described preparation of the wettable powder, the active ingredient was removed, that is, this composition consisted of white carbon, diatomaceous earth and wetting agent.

Inhibition rate :
5 : complete control
5
0 : no effect

Phytotoxicity :
+++ : severe damage
5
— : no damage (Test 3)

Inhibition of germination of sclerotium of Pellicularia Oryzae

Fifty g sclerotium having diameter of 1.5–2.0 mm which was collected from a paddy field wherein Pellicularia Oryzae had been caused in the former year, were wrapped in a gauze and dipped in the following solution.

The dipping time and the concentration of the ingredients are shown in Table 5. After dipping, the gauze wrapping sclerotium was washed with flowing water for 24 hours to remove the ingredient on the surface of sclerotium. The treated sclerotium were placed on a glass plate and put in a sealed vessel and were cultured at 27°C for 72 hours under the saturated humidity, and then a rate of germination of the sclerotium was determined. The results are shown in Table 5.

Table 5

| Ingredient | Concentration (ppm) | Dipping time (hr) | Rate of Germination (%) |
|---|---|---|---|
| Present Invention (C$_2$H$_5$)$_2$N-C(=O)-S-CH$_2$-C$_6$H$_4$-Cl | 10 | 24 | 0 |
|  | 3 | 24 | 0 |
| U.S. Pat. No. 2,992,091 (iso-C$_3$H$_7$)$_2$N-C(=O)-S-CH$_2$-C$_6$H$_3$Cl$_2$ | 10 | 24 | 80 |

Table 5 — Continued

| Ingredient | Concentration (ppm) | Dipping time (hr) | Rate of Germination (%) |
|---|---|---|---|
| (iso-C₃H₇)₂N-C(O)-S-CH₂-C₆H₃(Cl)(Cl) (2,4-di-Cl) | 10 | 24 | 82 |
| (iso-C₃H₇)₂N-C(O)-S-CH₂-C₆H₄-Cl | 10 | 24 | 86 |
| (iso-C₃H₇)₂N-C(O)-S-CH₂-C₆H₄-Cl | 10 | 24 | 80 |
| (CH₃)₂N-C(O)-S-CH₂-C₆H₅ | 10 | 24 | 90 |
| (C₂H₅)₂N-C(O)-S-CH₂-C₆H₄-Cl₃ | 10 | 24 | 94 |
| Australian Patent 272,661 | | | |
| (iso-C₃H₇)₂N-C(O)-S-CH₂-C₆H₃(Cl)(Cl) | 10 | 24 | 96 |
| (iso-C₃H₇)₂N-C(O)-S-CH₂-C₆H₄-Cl | 10 | 24 | 98 |
| (iso-C₃H₇)₂N-C(O)-S-CH₂-C₆H₅ | 10 | 24 | 88 |
| (CH₃)₂N-C(O)-S-CH₂-C₆H₄-Cl | 10 | 24 | 82 |
| (C₂H₅)₂N-C(O)-S-CH₂-C₆H₅ | 10 | 24 | 94 |
| (C₂H₅)₂N-C(S)-S-CH₂-C₆H₄-Cl | 10 | 24 | 88 |
| Water | — | 120 | 88 |

What is claimed is:
1. S-(4-chlorobenzyl)-N,N-diethylthiolcarbamate.

* * * * *